US006952672B2

(12) United States Patent
Smith

(10) Patent No.: US 6,952,672 B2
(45) Date of Patent: Oct. 4, 2005

(54) AUDIO SOURCE POSITION DETECTION AND AUDIO ADJUSTMENT

(75) Inventor: Bruce A. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 09/841,956

(22) Filed: Apr. 25, 2001

(65) Prior Publication Data

US 2002/0161577 A1 Oct. 31, 2002

(51) Int. Cl.[7] .......................... G10L 21/02; H04M 9/08

(52) U.S. Cl. .................... 704/226; 381/92; 379/387.01; 379/388.01

(58) Field of Search ............................ 381/387.01, 313, 381/317, 92, 94.7; 704/226, 227, 228; 379/388.01, 387.02, 388.02, 388.03, 390.01, 392.01

(56) References Cited

U.S. PATENT DOCUMENTS 4,396,799 A * 8/1983 Franzen et al. ........ 379/388.02
4,445,229 A * 4/1984 Tasto et al. ................. 381/110
4,961,177 A * 10/1990 Uehara ....................... 704/272
5,657,380 A * 8/1997 Mozer ..................... 379/88.01
5,729,604 A * 3/1998 Van Schyndel ........ 379/388.01
5,790,679 A * 8/1998 Hawker et al. ............. 381/163
5,991,726 A * 11/1999 Immarco et al. ............ 704/270
6,002,949 A * 12/1999 Hawker et al. .......... 455/569.1
6,243,683 B1 * 6/2001 Peters ........................ 704/273
6,273,421 B1 * 8/2001 Thalheimer et al. ........ 273/161
6,324,284 B1 * 11/2001 Hawker et al. ........ 379/433.02
6,532,447 B1 * 3/2003 Christensson ............... 704/275
6,542,436 B1 * 4/2003 Myllyla ....................... 367/95
6,560,466 B1 * 5/2003 Skorko ....................... 455/567
6,683,913 B1 * 1/2004 Kantschuk .................. 375/258
6,714,654 B2 * 3/2004 Lichtblau .................... 381/317

* cited by examiner

*Primary Examiner*—Martin Lerner
(74) *Attorney, Agent, or Firm*—Akerman Senterfitt

(57) ABSTRACT

A method for adjusting an operational characteristic of an audio device can include a series of steps. The method can include receiving a user spoken utterance from an audio speech source and detecting a position of the audio speech source relative to the audio device. The method further can include generating proximity data corresponding to the detected position and processing the received user spoken utterance with a selected signal processing technique based upon the proximity data. The signal processing technique can distinguish the user spoken utterance from background noise.

9 Claims, 2 Drawing Sheets

AUDIO SOURCE POSITION DETECTION AND AUDIO ADJUSTMENT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of personal communications devices, and more particularly, to improving audio signal quality in personal communications devices.

2. Description of the Related Art

The use of personal communications devices has become widespread. Examples of such devices can include cellular telephones, portable telephones, voice-enabled personal digital assistants, devices having a handset component, and the like. These devices not only facilitate communication between users and provide services as standalone units, but also can serve as an interface, or the first signal processing stage, for larger distributed voice-enabled systems. Notably, voice-enabled services often require a minimal level of audio signal quality for accurate performance. Accordingly, the use of a personal communications device which lacks the ability to produce an audio signal having a minimal quality can significantly limit the performance of a voice-enabled system. For example, in the case of a communications system, low quality audio signals can result in miscommunication between users. With regard to speech processing, low quality audio signals can lead to mis-recognized words.

Several factors can influence the quality of an audio signal generated by a personal communications device. One factor can be the distance between an audio speech source, such as a user's mouth, and the transducive element of the personal audio communications device. Typically, the distance between the audio source and the transducive element of the device changes over time as the user shifts body positions. For example, as a user speaks into a cellular telephone, the user can look about in various directions or inadvertently take the telephone away from the user's ear or mouth. As this distance changes, the audio characteristics of the user's speech also change over time. In particular, as the distance becomes smaller, the detected volume of the user's speech can increase. Thus, with the audio source located closer to the personal communications device, a higher quality audio signal having an increased signal to noise ratio can be generated by the personal communications device. As the distance increases, however, a lower quality audio signal having a lower signal to noise ratio can result.

The distance between a user and the personal communications device also can affect the user's ability to hear audio generated by the personal communications device. Notably, as the distance between the user and the personal communications device grows larger, the perceived volume of the audio generated by the device decreases. Thus, distance not only can affect the quality of audio signals generated by personal communications devices, but also can affect the user' ability to hear audio produced by the device.

Another factor which can affect audio signal quality can be the environment in which the device is used. By their nature, personal communications devices can be used in a wide variety of situations and environments with varying levels and sources of background noise. Moreover, unwanted or undesired sounds generated from various sound sources within an audio environment, referred to as background noise, can emanate from differing locations within that audio environment. Common examples can include, but are not limited to, automobile noise or other voices within a crowded public place. Regardless of the source, the inability to distinguish a desired speech signal from background noise can result in audio input signals having decreased signal to noise ratios.

SUMMARY OF THE INVENTION

The invention disclosed herein provides a method and a system for adjusting operational characteristics of a personal communication device. In particular, the invention can improve audio signal quality of input audio signals generated by the personal communications device. The invention can detect the position of an audio speech source relative to the position of the personal communication device and generate proximity data corresponding to the detected position. Based on the proximity data, operational characteristics relating to input audio signals, as well as output audio signals, can be adjusted. Notably, based on the proximity data, the audio output level can be increased, decreased, or remain unchanged. Additionally, suitable signal processing techniques can be applied to input audio signals. The signal processing techniques can distinguish desirable portions of received input audio signals from background noise, thereby increasing the signal to noise ratio of input audio signals.

One aspect of the present invention can include a method for adjusting an operational characteristic of an audio device. The method can include receiving a user spoken utterance from an audio speech source and detecting a position of the audio speech source relative to the audio device. Proximity data which corresponds to the detected position can be generated. Notably, proximity data can include a distance measurement. The received user spoken utterances can be processed with a selected signal processing technique based upon the proximity data. The selected signal processing technique can be selected from a plurality of signal processing techniques, wherein each signal processing technique can be associated with a proximity range. The signal processing technique can distinguish the user spoken utterance from background noise and alter an audio input beam. Additionally, the signal processing step can determine a phase component of the user spoken utterance and a common mode component of the user spoken utterance, wherein the user spoken utterance can be received by a plurality of input transducive elements.

Another embodiment of the invention can include a method for adjusting an operational characteristic of an audio device which can include detecting a position of an audio speech source relative to the audio device. The method further can include generating proximity data corresponding to the detected position and selectively adjusting an output level of the audio device based upon the proximity data. Notably, the proximity data can include a distance measurement. The output level can be selected from a plurality of predetermined output levels wherein each predetermined output level can be associated with a proximity range.

Another aspect of the invention can include an audio device including a proximity detector which can generate proximity data based on a position of an audio speech source relative to the audio device. The proximity detector can include an infrared transmitter which can transmit infrared energy from the audio device. An infrared detector can be included within the proximity detector. The infrared detector can detect at least part the infrared energy which can reflect off of the audio speech source. The audio device can include an input transducive element which can receive sound and produce corresponding input audio signals. An output element which can provide output audio signals from the audio device to the audio speech source can be included. The output element can be a speaker or a connection jack providing output audio to an output transducive element. The audio device can include audio circuitry which can convert input audio signals from analog to digital format and convert output audio signals from digital to analog format. A processor also can be included. The processor, which can include a digital signal processor, can process input audio signals and output audio signals using signal processing techniques based upon the proximity data.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE INVENTION

The invention disclosed herein provides a method and a system for adjusting operational characteristics of a personal communication device. In particular, the operational characteristics can be altered responsive to a detected position of an audio speech source such that the quality of the audio signals generated by the device can be enhanced. The invention can detect the position of an audio speech source relative to the position of the personal communication device and generate proximity data corresponding to the detected position. Based on the proximity data, operational characteristics relating to both input audio signals, as well as output audio signals, can be adjusted. Specifically, based on the detected proximity of an audio speech source, the audio output level can be increased, decreased, or remain unchanged. Additionally, the proximity data can be used to select a suitable signal processing technique to be applied to input audio signals such that the desirable portion of those signals can be distinguished from background noise.

The ability to distinguish sound from a desired audio speech source, such as a user, located at a particular location within an audio environment can be referred to as beam forming, a process known in the art. Using beam forming, sounds from the desired sound source can be distinguished from surrounding noises being generated from a plurality of sound sources. For example, sound from a sound source located several inches from a personal communications device can be targeted and isolated from background noise. Similarly, sounds from a more distant sound source also can be isolated from background noise. In any event, the signal processing techniques can be directed to audio signal components such as frequency, amplitude, phase, and common mode components based upon the proximity data.

Figure 1:
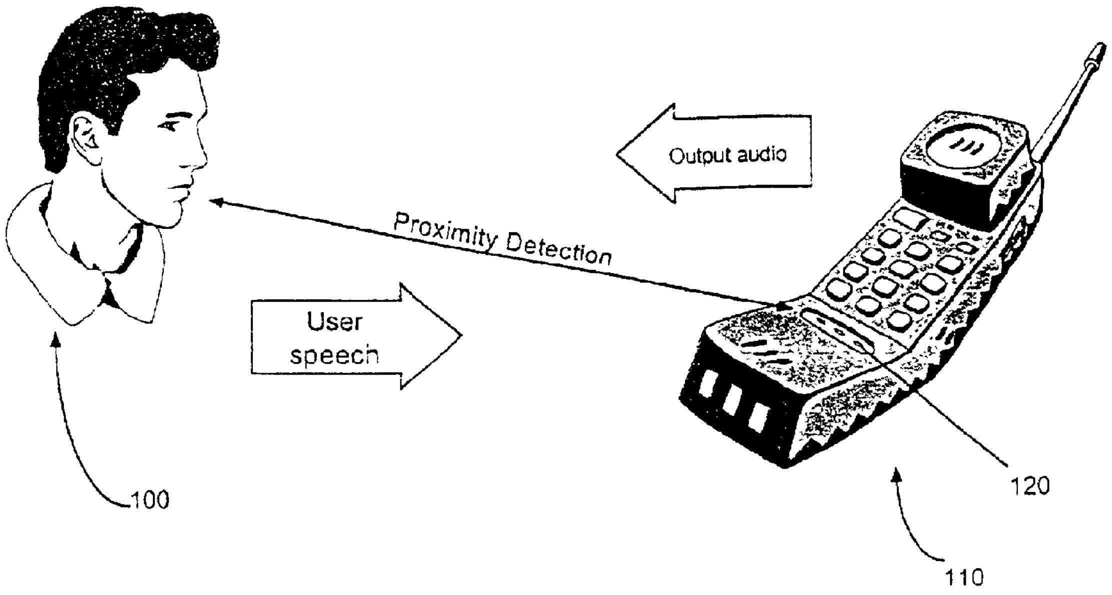
FIG. 1 is a pictorial illustration showing an exemplary audio speech source and personal audio communications device for use with the invention disclosed herein.

FIG. 1 is a pictorial illustration showing an exemplary audio speech source 100 and personal audio communications device 110 for use with the invention disclosed herein. As shown in FIG. 1, an audio speech source 100, such as a user, can interact with the personal communications device 110. The personal communications device 110 can include any voice-enabled device such as a cellular telephone, a voice-enabled personal digital assistant, a hand-held radio, or the like. The personal communications device 110 can be any portable device providing an audio interface allowing a user to access voice-based services, whether distributed over a network or contained within the personal communications device itself.

The personal communications device 110 can include a proximity detector 120. The proximity detector 120 can detect the proximity of the audio speech source 100 in relation to the personal communications device 110. The proximity detector 120 can be positioned on the face of the personal communications device 110 which is directed toward the audio speech source 100 when the personal communications device 110 is in use.

Figure 2:
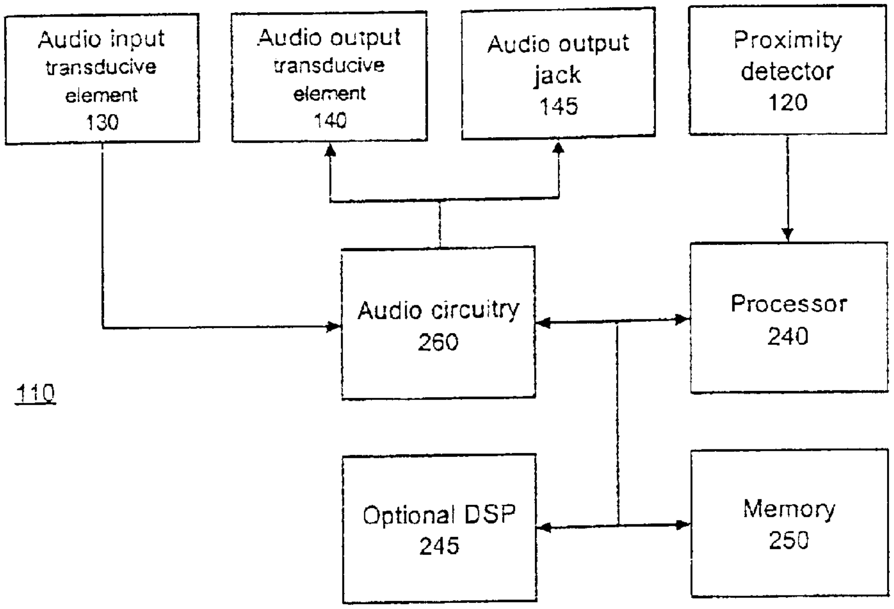
FIG. 2 is a block diagram illustrating an exemplary architecture for the personal communications device of FIG. 1.

FIG. 2 is a block diagram illustrating an exemplary architecture of the personal communications device 110 of FIG. 1. As shown in FIG. 2, the personal communications device 110 can include several components operatively connected through suitable interface circuitry such as a communications bus. A processor 240, an optional digital signal processor (DSP) 245, and one or more memory devices 250 can be included. The processors can be any suitable processor or DSP as is well known in the art. The memory devices 115 can be comprised of an electronic random access memory, read only memory, or other forms of high speech memory, including cache memories. It should be appreciated that a suitable bulk data storage medium, such as the Microdrive™ manufactured by International Business Machines, can be included within the personal communications device or accessed via a communications port or receptacle.

The personal communications device 110 further can include one or more transducive elements 130 such as a microphone for converting received sounds into electronic audio signals, an audio output jack 145 for providing audio output signals to an external transducive element such as a speaker or microphone/headset combination, and an audio output transducive element 140 such as a speaker for converting electronic audio output signals into audible sound. Each of the aforementioned components can be operatively connected to audio circuitry 260. The audio circuitry 260, as is known in the art, can perform standard audio processing functions such as analog to digital signal conversions, digital to analog signal conversions, as well as analog and digital signal attenuation and amplification. The audio circuitry can include one or more dedicated audio components, a dedicated audio integrate circuit, or a DSP such as the optional DSP 245. In any event, the audio circuitry 260 can be operatively connected to the processor 240, the memory 250, and the optional DSP 245 through the communications bus.

The proximity detector 120, which can be operatively connected directly to the processor or connected through the communications bus, can be any of a variety of proximity detectors as are known in the art. For example, the proximity detector 120 can include an infrared transmitter/receiver pair which can send infrared energy and detect infrared energy reflected off of the audio speech source. Another type of proximity detector can include an ultrasonic transmitter/ receiver pair. It should be appreciated that any suitable proximity detector can be used and the invention is not so limited to the embodiments disclosed herein. Regardless of the type of proximity detection utilized, the proximity detector 120 can generate proximity data corresponding to a distance from the proximity detector 120 to the audio speech source. Notably, the proximity detector can be tuned to operate within a limited range of several feet to increase accuracy and prevent distant objects from triggering false readings. The proximity detector 120 can be configured to generate analog data in the form of a voltage or current. In that case, the processor can be equipped with analog to digital conversion capabilities for obtaining digital representations of the analog proximity data. Alternatively, the proximity detector 120 can produce digital proximity data.

In operation, acoustic audio signals generated by the audio speech source 100 can be detected and converted to electronic analog audio signals by the audio input transducive elements 130. The resulting analog audio input signals can be converted to digital format using the audio circuitry 260. During operation of the personal communications device 110, the proximity detector 260 can determine proximity data which can include a value corresponding to the distance between the audio speech source 100 and the proximity detector 120. Based upon the proximity data, the processor 240 can select a signal processing algorithm which can correspond to the detected proximity. The selected signal processing algorithm can be applied to the digitized audio input signals. It should be appreciated that the invention can include any number of predetermined and user definable distance ranges, each corresponding to a particular signal processing technique or algorithm. The number of predetermined distance ranges need only be limited by the resolution of the proximity detector. Accordingly, the invention can include two, three, four, or more distance ranges, each associated with one or more signal processing techniques and algorithms for processing input audio signals.

It should be appreciated that any of a variety of signal processing techniques, including digital signal processing techniques, can be applied to the input audio signals. For example, based on the proximity of the audio speech source to the personal communications device, different signal processing techniques can be used. These techniques can be directed at frequency and amplitude components of the received input audio signals. In another embodiment of the present invention where several audio input transducive elements can be included, phase and common mode analysis of the input audio signals can be performed using the audio input signals produced by the plurality transducive elements. Regardless, amplitude, frequency, phase, and common mode information can be used in conjunction with the proximity data to distinguish the desired portion of the input audio signal from background noise.

The proximity data further can be used to adjust audio output signal levels. For audio speech sources located farther away from the personal communications device, the output level can be increased. For audio speech sources located closer to the personal communications device, the output level can be decreased. Digital audio data, whether received from a back-end voice-enabled system or stored within the personal communications device itself, can be processed using digital signal processing algorithms known in the art for increasing or decreasing the output level of the digital audio signal. Alternatively, once the digital audio signal is converted to an analog output signal using the audio circuitry 260, the output level of the analog signal can be altered using control mechanism and amplification circuitry. The resulting analog audio output signal can be provided to the audio output transducer 140 or the audio output jack 245.

Figure 3:
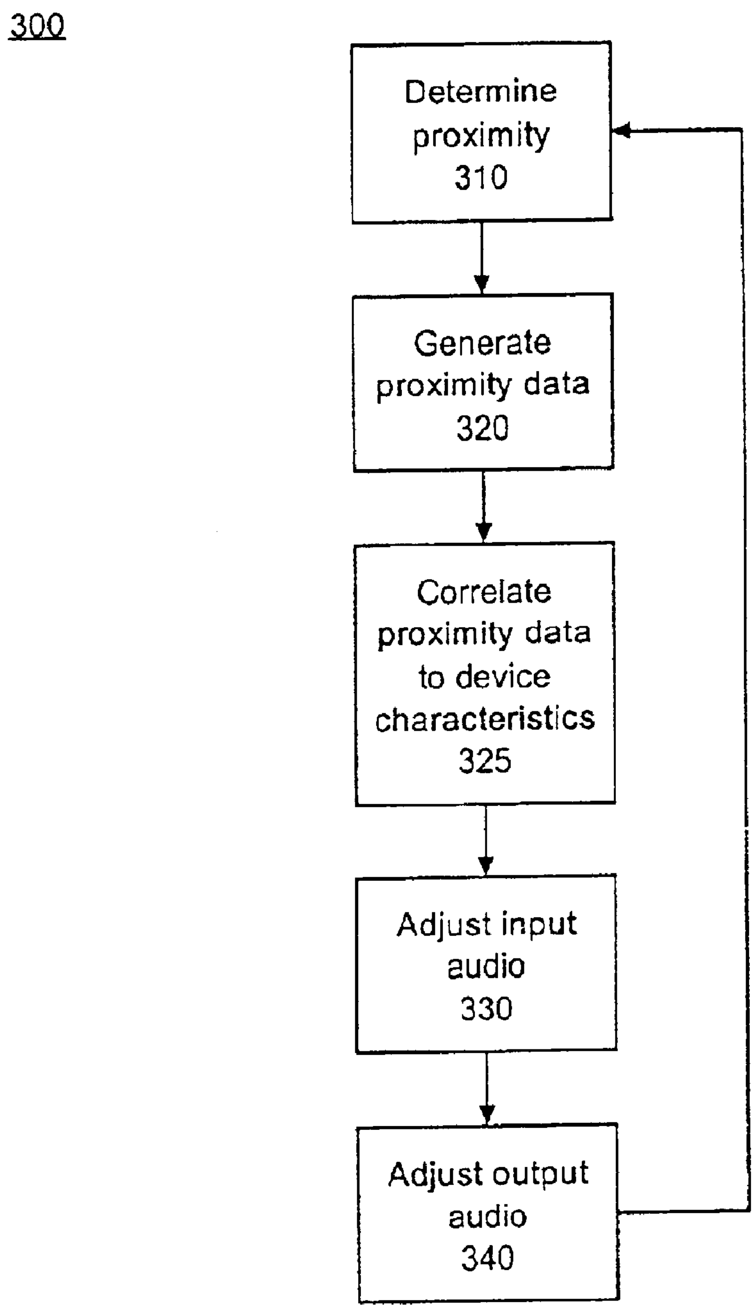
FIG. 3 is a flow chart illustrating an exemplary method of the invention.

FIG. 3 is a flow chart 300 illustrating an exemplary method of the invention for use with the personal communications device 100 of FIG. 1. Beginning in step 310, the proximity of an audio speech source in relation to the personal communications device can be determined. In step 320, proximity data can be generated. As mentioned, the proximity data can include a distance component or value corresponding to the distance between the audio speech source and the personal communications device. Notably, the distance can be expressed in any of a variety of measurement units whether in digital or analog form.

In step 325, the proximity data can be correlated to the personal communications device. Specifically, one of a plurality of predefined distance ranges including the distance component of step 320 can be identified. The invention can include independent distance ranges corresponding to the input characteristics and the output characteristics. Alternatively, a single set of distance ranges can be used which correspond to both the input and output characteristics. Notably, the distance ranges can be user definable. Each input audio characteristic distance range can correspond to a particular signal processing technique which can be suited to maximize the signal to noise ratio of sound from an audio speech source located within the predefined range. Similarly, each output audio characteristic distance range can correspond to a particular output volume level.

In step 330, the audio input characteristics of the personal communications device can be adjusted in accordance with the proximity data. In particular, the signal processing technique corresponding to the identified distance range can be applied to the audio input data. In step 340, the output characteristics also can be adjusted in a manner consistent with the proximity data. Specifically, the output level of the personal communications device can be adjusted based upon the distance between the audio speech source and the personal communications device. It should be appreciated that the output level adjusting functionality can be bypassed in particular cases such as when an external device is connected to the audio output jack. Similarly, if a headset microphone/speaker combination is used, the input and output audio characteristic adjustment functionality can be bypassed. After completion of step 340, the method can repeat as needed to continually adjust input and output characteristics consistent with detected proximity data. Further, it should be appreciated that a feedback loop can be incorporated wherein previously determined signal processing data can be used in conjunction with proximity data to control the input and output characteristics.

The present invention can be realized in hardware, software, or a combination of hardware and software. A method and a system for adjusting operational characteristics of a personal communication device according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a personal communications device such as a cellular telephone, voice-enabled personal digital assistant, or other voice-enabled device having a handset component, wherein the device includes a computer program that, when being loaded and executed, controls the computer system such that it carries out the methods described herein. The present invention also can be embedded in a computer program product, which comprises all the features enabling the implementation of the methods described herein, and which, when loaded in a computer system, is able to carry out these methods.

Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. An audio device, comprising:

a proximity detector generating proximity data based on a position of an audio speech source relative to said audio device;

at least one input transducive element, said input trausducive element receiving sound and producing corresponding input audio signals;

an output element, said output element providing output audio signals from said audio device to said audio speech source;

audio circuitry, said audio circuitry converting said input audio signals from analog to digital format and converting said output audio signals from digital to analog format; and a processor, said processor processing said input audio signals and said output audio signals using signal processing techniques based upon said proximity data.

2. The audio device of claim 1, wherein said output element is a speaker.

3. The audio device of claim 1, wherein said output element is a connection jack providing output audio signals to an output transducive element.

4. The audio device of claim 1, said processor including a digital signal processor processing said input audio signals and said output audio signals.

5. The audio device of claim 1, said proximity detector comprising:

an infrared transmitter, said infrared transmitter transmitting infrared energy from said audio device; and an infrared detector, said infrared detector detecting at least part of said infrared energy reflected off of said audio speech source.

6. The audio device of claim 1, wherein at least one of the signal processing techniques used by said processor distinguishes a desired portion of the input audio signals from background noise.

7. The audio device of claim 1, wherein at least one of the signal processing techniques used by said processor adjusts audio output signal levels in accordance with said proximity data, wherein when the audio speech source is further away from the audio device then a predetermined distance, audio output signal levels are increased, and wherein when the audio speech source is closer to the audio device than a predetermined distance, audio output signal levels are decreased.

8. The audio device of claim 1, wherein each of the signal processing techniques for adjusting input audio signals corresponds to an identified distance range, wherein the processor adjusts audio input signals using at least one signal processing with a corresponding identified distance range that includes a distance that the audio speech source is from the audio device as indicated by the proximity data.

9. The audio device of claim 1, wherein each of the signal processing techniques for adjusting output audio signals corresponds to an identified distance range, wherein the processor adjusts audio output signals using at least one signal processing with a corresponding identified distance range that includes a distance that the audio speech source is from the audio device as indicated by the proximity data.

* * * * *